US009715004B2

(12) United States Patent
Faragher

(10) Patent No.: US 9,715,004 B2
(45) Date of Patent: *Jul. 25, 2017

(54) RADIO POSITIONING OF A MOBILE RECEIVER USING A VIRTUAL POSITIONING REFERENCE

(71) Applicant: BAE SYSTEMS plc, London (GB)

(72) Inventor: Ramsey Michael Faragher, Huyton (GB)

(73) Assignee: BAE Systems plc, London (GB)

( * ) Notice: Subject to any disclaimer, the term of this patent is extended or adjusted under 35 U.S.C. 154(b) by 10 days.

This patent is subject to a terminal disclaimer.

(21) Appl. No.: 14/982,311

(22) Filed: Dec. 29, 2015

(65) Prior Publication Data

US 2016/0109551 A1    Apr. 21, 2016

Related U.S. Application Data

(63) Continuation-in-part of application No. 13/500,016, filed as application No. PCT/GB2010/051654 on Oct. 4, 2010, now Pat. No. 9,261,579.

(30) Foreign Application Priority Data

Oct. 5, 2009  (EP) ................................ 09275091
Oct. 5, 2009  (EP) ................................ 09275092
(Continued)

(51) Int. Cl.
*G01S 5/02*    (2010.01)
*G01S 19/07*   (2010.01)
(Continued)

(52) U.S. Cl.
CPC ............ *G01S 5/0263* (2013.01); *G01C 21/20* (2013.01); *G01S 5/021* (2013.01); *G01S 19/07* (2013.01);
(Continued)

(58) Field of Classification Search
CPC ........ G01S 5/0263; G01S 19/07; G01S 19/48; G01S 5/021; G01C 21/20; G05D 1/0278; G05D 1/0285; G05D 2201/0213
(Continued)

(56) References Cited

U.S. PATENT DOCUMENTS 4,024,383 A * 5/1977 Beasley .................... G01S 5/10
                                                  342/388
5,563,786 A * 10/1996 Torii ....................... G01C 21/00
                                                  342/457
(Continued)

*Primary Examiner* — Fadey Jabr
*Assistant Examiner* — Angelina Shudy
(74) *Attorney, Agent, or Firm* — Maine Cernota & Rardin

(57) ABSTRACT

Methods and systems are disclosed for radio positioning of a vehicle using a virtual positioning reference established by logging a known position of the vehicle together with a local time that a first instance of a predictably repeated code word is received from an opportunistic terrestrial radio transmitter. During movement of the vehicle to a second, unknown position, a local clock is used to determine the time difference between when the virtual positioning reference is predicted to receive a second instance of the code word and when the vehicle actually receives the second instance of the code word, thereby providing positioning information when traditional navigation signals such as GPS are not available. The radio positioning information is then used to initiate an action such as recording the location information for future retrieval by a user, and/or controlling the movements of an autonomous vehicle.

17 Claims, 4 Drawing Sheets

(30) Foreign Application Priority Data

| Oct. 5, 2009 | (GB) | 0917384.0 |
|---|---|---|
| Oct. 5, 2009 | (GB) | 0917388.1 |
| Nov. 27, 2009 | (EP) | 09177349 |
| Nov. 27, 2009 | (GB) | 0920772.1 |
| Jun. 7, 2010 | (EP) | 10275059 |
| Jun. 7, 2010 | (GB) | 1009486.0 |
| Aug. 10, 2010 | (GB) | 1013413.8 |

(51) Int. Cl.
  *G05D 1/02* (2006.01)
  *G01S 19/48* (2010.01)
  *G01C 21/20* (2006.01)

(52) U.S. Cl.
  CPC ............ *G01S 19/48* (2013.01); *G05D 1/0278* (2013.01); *G05D 1/0285* (2013.01); *G05D 2201/0213* (2013.01)

(58) Field of Classification Search
  USPC .......................................... 701/23; 342/463
  See application file for complete search history.

(56) References Cited

U.S. PATENT DOCUMENTS

| 6,272,405 | B1* | 8/2001 | Kubota | G01C 21/12 342/357.31 |
|---|---|---|---|---|
| 6,529,165 | B1* | 3/2003 | Duffett-Smith | G01S 1/024 342/463 |
| 7,769,544 | B2* | 8/2010 | Blesener | B61L 29/28 246/124 |
| 8,072,383 | B1* | 12/2011 | Martin | G01S 5/0221 342/387 |
| 8,644,850 | B2* | 2/2014 | Faragher | G01S 5/02 455/456.1 |
| 9,261,579 | B2* | 2/2016 | Faragher | G01S 5/02 |
| 9,424,694 | B2* | 8/2016 | Senalp | G06Q 10/063 |
| 9,568,587 | B2* | 2/2017 | Faragher | G01S 5/0252 |
| 2004/0148093 | A1* | 7/2004 | Tanaka | G01C 21/00 701/400 |
| 2008/0032706 | A1* | 2/2008 | Sheynblat | G01S 5/0036 455/456.1 |
| 2008/0077283 | A1* | 3/2008 | Ueyama | G01C 21/26 701/1 |
| 2009/0115658 | A1* | 5/2009 | Zimmerman | G01S 19/11 342/357.27 |
| 2012/0194389 | A1* | 8/2012 | Faragher | G01S 5/02 342/463 |
| 2013/0229303 | A1* | 9/2013 | Marshall | G01S 5/00 342/357.29 |
| 2016/0363648 | A1* | 12/2016 | Mindell | G01S 5/021 |
| 2016/0363659 | A1* | 12/2016 | Mindell | G01S 5/021 |
| 2016/0363663 | A1* | 12/2016 | Mindell | G01S 13/878 |
| 2016/0363664 | A1* | 12/2016 | Mindell | G01S 7/352 |

* cited by examiner

RADIO POSITIONING OF A MOBILE RECEIVER USING A VIRTUAL POSITIONING REFERENCE

RELATED APPLICATIONS

This application is a continuation in part of U.S. application Ser. No. 13/500,016, which is herein incorporated by reference in its entirety for all purposes. U.S. application Ser. No. 13/500,016 is a national phase application filed under 35 USC §371 of PCT Application No. PCT/GB2010/051654 with an International filing date of Oct. 4, 2010. PCT Application No. PCT/GB2010/051654 claims priority of the following: GB Patent Application 0917388.1 filed Oct. 5, 2009, EP Patent Application 09275092.6 filed Oct. 5, 2009, GB Patent Application 0917384.0 filed Oct. 5, 2009, EP Patent Application 09275091.8 filed Oct. 5, 2009, GB Patent Application 0920772.1 filed Nov. 27, 2009, EP Patent Application 09177349.9 filed Nov. 27, 2009, GB Patent Application 1009486.0 filed Jun. 7, 2010, EP Patent Application 10275059.3 filed Jun. 7, 2010, and GB Patent Application 1013413.8 filed Aug. 10, 2010. Each of these applications is herein incorporated by reference in their entirety for all purposes.

FIELD OF THE INVENTION

The present invention relates to a method and system for radio positioning and guidance of a mobile vehicle by using a virtual positioning reference. The method and system can advantageously utilize radio signals originating from opportunistic terrestrial unsynchronized radio transmitters, for example, television, cellular, Wi-Fi, public radio and the like.

BACKGROUND OF THE INVENTION

A commonly used resource for outdoor navigation and guidance of vehicles is satellite positioning technology, otherwise known as a Global Navigation Satellite System (GNSS). One example of a fully operational GNSS is the United States NAVSTAR Global Positioning System (GPS)—which will be referred to below when generally discussing satellite positioning technology. However, it will be appreciated that satellite positioning technologies other than GPS may be used in its place.

The operation of GPS is well known in the art, and generally employs a GPS receiver configured to receive signals from a number of GPS satellites. Each satellite broadcasts its own location and providing the GPS receiver can receive the broadcasted signals from a sufficient number and distribution of satellites, the GPS receiver can infer its own position.

A vehicle may therefore self-localize by employing a positioning system having a GPS receiver. However, in the event that a GPS receiver is not able to infer the vehicle's position—for example due to signal interference, then it may be possible for a vehicle positioning system to make use of other positioning resources.

For example, a vehicle can navigate using radio signals transmitted by terrestrial radio transmitters such as cellular telephone base stations, television and the like. The signals transmitted by such radio transmitters have distinguishing radio signal characteristics—such as repeated and unique code words—that can be exploited by a suitable positioning system for navigation. These radio signal characteristics, along with information about the locations of the transmitters, can be used to determine the position of a vehicle using known localization techniques such as multilateration and Enhanced Observed Time Difference (EOTD), as is known in the art.

In some of these approaches, the regular or otherwise predictably repeated code words are used to allow a positioning system receiver to synchronize with the transmitters. Once synchronized with a set of transmitters, a receiver can thereby determine the relative arrival times of the code words from the available set of terrestrial transmitters. As the vehicle moves and the relative arrival times vary, the receiver can determine its position accordingly. This process is relatively straightforward for transmitters that are synchronized with one another (as is the case with GPS). However, opportunistic terrestrial radio signal transmitters that are available to a positioning system are not usually synchronized—even if they are set up to transmit the same radio signal type, with the same code word repeat rate. For opportunistic radio signal transmitters of different types (e.g. different bandwidths and/or frequencies)—e.g. a cellular transmitter versus a DAB transmitter, synchronization is highly improbable.

As can be observed from a navigation system such a GPS, synchronization between the radio signal sources is very useful for radio localization—but is often not possible in an environment in which opportunistic, unsynchronized terrestrial radio signals are the only radio signal sources available for localization.

One known solution in the art is to compensate for the lack of synchronization by calculating clock offsets (relative to an imaginary universal 'absolute' clock) for each transmitter, and storing these offsets for use as clock corrections. In particular, a navigation system can make use of the following Equation 1 to calculate transmitter clock offsets for use in 'emulating' synchronicity:

$$ct = |r-b| + \epsilon + \alpha \qquad (1)$$

Where:
  c is the known speed of the radio waves;
  t represents the arrival time (measured at the receiver position using a clock local to the autonomous vehicle) of a transmission from a transmitter;
  r and b are vectors of the positions of the receiver and transmitter respectively. For example, each vector could be the "x, y" values in a Cartesian environment;
  $\epsilon$ represents the error of the clock local to the autonomous vehicle; and
  $\alpha$ represents the transmitter clock offset.

Prior art vehicle navigation systems that attempt to make use of unsynchronized radio transmitters for navigation can therefore calculate the transmitter clock offset $\alpha$ and local clock error $\epsilon$ by collecting timing measurements at a number of different known vehicle positions relative to a stationary transmitter having a known location.

However, the calculation of the transmitter clock offset a and local clock error c values can be computationally expensive, especially when considering that multiple transmitters are required for effective self-localization. This is especially the case in a system that has the capability of dealing with imperfect data, for example by applying a localization estimation filter. In such a case, a state vector will need to be maintained, which will include calculating the offset values for every transmitter, as well as the errors/uncertainties associated with each of them.

Furthermore, if a vehicle employs a relatively cheap and simple navigation device, the local onboard clock is not likely to be stable. Therefore, the calculated value of a local clock error at one instance may not necessarily apply at another instance, thereby adversely affecting the position calculation. Accordingly, it would be beneficial for a vehicle navigation system to negate the effect of the local clock error.

While it is possible to obtain a highly stable clock reference using an atomic clock, or via a GPS fix, these are not necessarily practical solutions for many vehicles. Atomic clock references are heavy, expensive and unsuitable for use in many vehicle navigation devices. A stable timing reference can be obtained via GPS, but this relies on availability of a continuous GPS fix, and so is not possible under conditions in which a GPS signal cannot be obtained.

It is possible to formulate a local clock error model with which an attempt can be made to compensate for the likely error in an unstable local clock. However, the model needs to be calculated/calibrated for the eccentricities of each local clock independently, and must be updated over time. To do this is computationally expensive, and so undesirable in many vehicles, such as a small, remotely controlled or autonomous vehicle in which content weight, processing power, and battery life are valuable resources.

These are problems associated with the prior art devices that make use of the above Equation 1. What is needed, therefore, is a relatively cheap, light, portable vehicle navigation device able to utilize terrestrial radio signal transmitters for self-localization in the event that a GPS signal cannot be obtained. To save on battery usage and overall weight, it may also be desirable to reduce the computational burden involved with self-localization of such a device beyond those making use of the above Equation 1.

SUMMARY OF THE INVENTION

According to a first aspect of the present invention there is provided a method for radio positioning of an autonomous vehicle comprising:
 determining the position of the autonomous vehicle as being at a first known position;
 when the autonomous vehicle is at said first known position:
  scanning for signals from terrestrial transmitters of a plurality of different transmitter types, said plurality of different transmitter types including at least one type of transmitter that transmits signals of opportunity that are not intended for navigational use;
  distinguishing from among said signals a first signal transmitted by a first terrestrial transmitter having a known first transmitter location;
  analyzing said first signal to identify a distinguishable, predictably repeated first code word and a repeat rate thereof; and
  establishing a virtual positioning reference by logging the first known position together with a local time at which a first instance of the predictably repeated first code word is received by the autonomous vehicle from the first terrestrial transmitter, the local time being measured relative to a clock that is local to the autonomous vehicle;
 running the local clock during movement of the autonomous vehicle from the first known position to a second position, said second position being unknown;
 when the autonomous vehicle is at the second position, using the local clock to determine a first time difference between when the virtual positioning reference is predicted to receive a second instance of the first code word and when the autonomous vehicle actually receives the second instance of the first code word, and thereby determining radio positioning information relevant to the second position of the autonomous vehicle; and
 controlling a movement of the autonomous vehicle according to guidance information that includes the radio positioning information.

The apparatus and method of this first aspect of the present invention thereby exploits the clock stability of the transmitter from which a virtual positioning reference is established by assuming that the clock offset associated with the transmitter will not change during the time in which the autonomous vehicle is moving between the first and second positions. Assuming a stable transmitter clock, it is thereby possible to relieve the autonomous vehicle from the computational burden of needing to calculate the transmitter clock offset, because the offset is eliminated during the step of determining the time difference between when the virtual positioning reference is predicted to receive the second instance of the code word and when the autonomous vehicle actually receives the second instance of the code word. In other words, because a differential method is used for determining the position of the autonomous vehicle, it is not necessary to calculate the transmitter clock offset. This approach will only be valid if the transmitter clocks exhibit high levels of stability, so that there no significant error accrues between the time that the most recent virtual positioning reference is established and the time that the autonomous vehicle determines its position at an unknown location. Fortunately, modern digital opportunistic signal sources such as cellular, DAB, DVB, etc transmissions exhibit very high stabilities that allow the present method to be utilized for many hours after establishing a virtual reference.

For the avoidance of doubt, it will be understood that the determined time difference is associated with the change in position of the autonomous vehicle from the first position to the second position relative to the transmitter.

The present invention is applicable to radio positioning using radio signals of opportunity—i.e. those which are not specifically intended for navigation and which may not have been previously encountered, or at least have initially unknown characteristics. Therefore, the autonomous vehicle, when at the first known position, may establish a profile of any initially unknown radio signal. For example, the profile may comprise identifying characteristics of the radio signal such as specific code words that allow a confident association of the radio signal with a particular transmitter. Furthermore, the method may comprise determining the repeat rate of the terrestrial radio signal transmitter so as to predict when the virtual positioning reference will receive a second instance of the code word. As mentioned supra, characteristics such as the code word repeat rate may be determined by analyzing the radio signal originating from the transmitter.

The method may comprise deriving the position of the autonomous vehicle at the first known position via a primary positioning resource, such as a GPS receiver, local to the autonomous vehicle. The second unknown position may be at a position at which the primary positioning resource of the autonomous vehicle, such as a GPS, is rendered ineffective.

Such use of a primary positioning resource such as a GPS receiver allows the autonomous vehicle to confidently determine an initial first position. Where a GPS receiver is the primary positioning resource, this is when the GPS receiver is able to receive GPS signals from a sufficient number of satellites. Under certain conditions, for example when the autonomous vehicle is operating under foliage, indoors or otherwise in environments where the GPS signal is subject to interference, the autonomous vehicle can then fall back onto the radio positioning method using terrestrial radio signals that is disclosed herein.

It will be noted that such opportunistic radio signals are generally not set up specifically to allow navigation, and so can be difficult to utilize over the long term. For example, opportunistic terrestrial transmitters in a given geographical area tend not to be of the same type (e.g. of different frequencies, signal structures, and bandwidths) and are not typically synchronized with one another. Thus, GPS may be used as the primary positioning resource to self-localize whenever possible, and the secondary terrestrial-transmitter-based radio-localization may only be used during relatively short periods during which the primary positioning resource is rendered ineffective.

Embodiments of the present invention comprise calculating the time difference using a differential positioning module local to the autonomous vehicle. The differential positioning module may be configured to calculate differential corrections relative to real/actual reference base stations.

The same differential positioning module can be used in conjunction with both virtual positioning references and real reference base stations that are intended for navigation. This can be useful because the autonomous vehicle may be able to receive information from a real reference base station and use this information to localize and/or improve localization. In doing so, the calculations necessary can be performed through the same differential positioning module, reducing the complexity of the guidance system in the autonomous vehicle. In practice, if the differential calculation module is implemented in hardware, the reduced physical circuitry ("silicon real estate") can increase the portability of the guidance system. Potentially, this may also reduce the computational burden on a general purpose processor of the guidance system.

Embodiments of the present invention can be used in combination with current systems that require a real reference receiver, so that the present invention serves to bridge any gaps caused by communication dropout in reception of the "real" reference signal. The autonomous vehicle, on losing contact with the reference receiver, can then generate the required reference positioning measurements from the real reference and carry on in the meantime using signals from transmitters of opportunity while employing the same positioning algorithms, filters, and processes, until communication with the real reference is reestablished. This approach will tend to provide the highest level of positioning accuracy if the communications drop outs are short enough such that the transmitter clocks of the opportunistic transmitters remain sufficiently stable during the communication drop-out period.

Embodiments of the present invention comprise establishing a plurality of virtual positioning references at known locations spaced apart from one another, so as to improve the determination of the location of the autonomous vehicle. For example, the effect of multipath interference is reduced if the number of virtual positioning references is increased, due to the low likelihood of the same multipath error occurring at every spaced-apart reference position.

Embodiments comprise the autonomous vehicle receiving transmissions from a plurality of geographically spaced terrestrial transmitters, at least some of which may be transmitters of opportunity, each transmitter transmitting predictably repeated code words that are distinguishable from one another. The ability of the autonomous vehicle to self-localize is improved as the number of transmitters opportunity that are geographically spaced from one another is increased.

Embodiments comprise capturing radio signal data using a radio signal capture window, the length of which is limited to substantially the repeat period of the most slowly repeating code word. By limiting the radio signal capture window, the amount of data that the guidance system of the autonomous vehicle will need to log is reduced. The capture length limit is defined by the minimum time during which it is possible to guarantee that a code word will be received from a transmitter.

Embodiments of the present method comprise predicting when a code-word from a given transmitter of opportunity is expected to arrive at the autonomous vehicle, and opening a radio signal capture window at substantially this time. The radio signal capture window may be opened for a time period that is equal to or only slightly larger than the minimum time period that is needed to receive the code word. This can reduce the amount of superfluous data that is captured.

Embodiments comprise applying the equation:

$$c(t_{new}-t_{ref})=|r_{new}-b|-|r_{ref}-b|+(\alpha_{new}-\alpha_{ref})+(\epsilon_{new}-\epsilon_{ref}) \quad (2)$$

where:
c is the known speed of the radio waves;
$t_{new}$ represents the time, measured at the autonomous vehicle using the local clock, at which the second instance of the code word is received by the autonomous vehicle at the second position;
$t_{ref}$ represents the time, measured at the autonomous vehicle using the local clock, at which the virtual positioning reference is predicted to receive the second instance of the code word;
$r_{new}$ is the new (second unknown) position of the autonomous vehicle;
b is the position of the stationary transmitter;
$r_{ref}$ is the reference (first known) position of the autonomous vehicle;
α represents the transmitter clock offset;
$\epsilon_{ref}$ represents the error of the clock local when the reference measurements ($t_{ref}$) were established; and
$\epsilon_{new}$ represents the error of the clock local to the autonomous vehicle.

Clock errors tend to be removed by this virtual position reference technique as long as the transmitter clock offset values a are stable during the time period $t_{new}-t_{ref}$ over which the autonomous vehicle is moving between the known first position and the unknown second position.

In effect, the measurements that would have been expected at time $t_{new}$ at the first position, if the autonomous vehicle had not moved, are calculated. This calculation is possible because the repeat rate of the transmitter's code word is known and its transmitter reference is highly stable. The autonomous vehicle's motion relative to the starting reference point and the transmitter can then be inferred immediately from the difference between the times of arrival of the real second measurement and the estimated times of arrival at the virtual positioning reference.

In embodiments, the autonomous vehicle is able to receive transmissions from a plurality of transmitters. This allows a "single difference" calculation to be performed so as to remove any effect of a local clock error. Thus it is not necessarily required to undertake the computationally burdensome task of establishing a local clock error model. The single different calculation can be performed by taking the differences between pairs of measurements from different transmitters. This leaves the effects of multipath interference, signal geometry and measurement noise as the main sources of error.

An example of a single-difference measurement between pairs of transmitter measurements is shown as follows:

$$c(t^A_{new}-t^A_{ref})-c(t^B_{new}-t^B_{ref})=(|r_{new}-b^A|-|r_{ref}-b^A|+(\epsilon_{new}-\epsilon_{ref}))-(|r_{new}-b^B|-|r_{ref}-b^B|+(\epsilon_{new}-\epsilon_{ref})) \quad (3)$$

As can be seen, local clock errors can thus be removed. Assuming no other available data, the minimum number of transmitters required for a two-dimensional position estimate is three, and the minimum number of transmitters required for a three-dimensional position estimate is four. However, if fewer transmitters are available, information relevant to the position of the autonomous vehicle can still be determined, as discussed below. In some cases, as discussed below, the information obtained from terrestrial transmitters can be combined with other information provided, for example, by an inertial navigation system, so as to determine an estimate of the two-dimensional or three-dimensional position of the vehicle.

It will be clear to one of skill in the art that the value of $t_{ref}$ can be determined by adding a multiple of the repeat rate of the code word transmission to the original time at which the first instance of the code word was measured by the autonomous vehicle at the first position. More particularly:

$$t_{ref}=t_{start}+N \cdot P \quad (4)$$

where $t_{start}$ is the time at which the first instance of the code word is received by the autonomous vehicle at the first position, P is the period between transmitter code-word broadcasts according to a perfect clock, and N is the number of transmitter code words expected to have been broadcast since the first timing measurement $t_{start}$.

While the invention is described above in regard to a guidance system of an autonomous vehicle, it should be understood that the invention is not limited to this application. In other embodiments, vehicle position information obtained by the present invention is used to initiate other actions, such as presenting the position on a display or recording the information on non-transient media for future access by a user as needed.

In particular, according to a second aspect of the present invention there is provided a method for radio positioning of a vehicle comprising:
  determining the position of the vehicle as being at a first known position;
  when the vehicle is at said first known position:
  scanning for signals from terrestrial transmitters of a plurality of different transmitter types, said plurality of different transmitter types including at least one type of transmitter that transmits signals of opportunity that are not intended for navigational use;
  distinguishing from among said signals a first signal transmitted by a first terrestrial transmitter having a known first transmitter location;
  analyzing said first signal to identify a distinguishable, predictably repeated first code word and a repeat rate thereof; and
  establishing a virtual positioning reference by logging the first known position together with a local time at which a first instance of the predictably repeated first code word is received by the vehicle from the first terrestrial transmitter, the local time being measured relative to a clock that is local to the vehicle;
  running the local clock during movement of the vehicle from the first known position to a second position, said second position being unknown;
  when the vehicle is at the second position, using the local clock to determine a first time difference between when the virtual positioning reference is predicted to receive a second instance of the first code word and when the vehicle actually receives the second instance of the first code word, and thereby determining radio positioning information relevant to the second position of the vehicle; and
  recording the positioning information and storing the positioning information for subsequent presentation to a user.

Timing information may comprise the time, relative to a clock local to the vehicle, at which a radio signal timing characteristic—such as a predictably repeated code word—is received by the vehicle from the transmitter.

The local clock may be run during movement of the vehicle between the first and second positions so as to measure the time interval between the receptions of the first and second timing information.

The transmitter may be terrestrial and stationary and/or may have a position that is known or determinable by the vehicle.

The first known position of the vehicle may be provided by a satellite positioning receiver, such as a GPS receiver, local to the vehicle. The second unknown position may be at a position at which the vehicle is denied GPS signals.

According to a third aspect of the present invention there is provided an vehicle and/or navigation system configured to perform the method according to anyone of the first and/or second aspects of the invention.

According to a fourth aspect of the present invention there is provided a non-transitory carrier medium for carrying a computer readable code configured to direct a computing device to carry out the method according to any one of the first and/or second aspects of the invention.

According to a fifth aspect of the present invention there is provided an vehicle configured to self-localize using radio positioning by:
  determining the position of the vehicle as being at a first known position;
  when the vehicle is at said first known position:
  scanning for signals from terrestrial transmitters of a plurality of different transmitter types, said plurality of different transmitter types including at least one type of transmitter that transmits signals of opportunity that are not intended for navigational use;
  distinguishing from among said signals a first signal transmitted by a first terrestrial transmitter having a known first transmitter location;
  analyzing said first signal to identify a distinguishable, predictably repeated first code word and a repeat rate thereof; and
  establishing a virtual positioning reference by logging the first known position together with a local time at which a first instance of the predictably repeated first code word is received by the vehicle from the first terrestrial transmitter, the local time being measured relative to a clock that is local to the vehicle;
  running the local clock during movement of the vehicle from the first known position to a second position, said second position being unknown;
  when the vehicle is at the second position, using the local clock to determine a first time difference between when the virtual positioning reference is predicted to receive a second instance of the first code word and when the vehicle actually receives the second instance of the first code word, and thereby determining radio positioning information relevant to the second position of the vehicle; and either recording the positioning information and storing the positioning information for subsequent presentation to a user, and/or controlling a movement of the vehicle according to guidance information that includes the information relevant to the second position of the vehicle;

In embodiments, the method further comprising applying the equation:

$$c(t_{New}-t_{ref})=|r_{New}-b|-|r_{ref}-b|+(\alpha_{New}-\alpha_{ref})+(\epsilon_{New}-\epsilon_{ref}) \quad (5)$$

where:

c is the known speed of the radio waves;

$t_{New}$ represents the time, measured at the vehicle using the local clock, at which the second instance of the first code word is received by the vehicle at the second position;

$t_{ref}$ represents the time, measured at the vehicle using the local clock, at which the virtual positioning reference is predicted to receive the second instance of the first code word;

$r_{New}$ is the second position of the vehicle;

b is the known first transmitter location;

$r_{ref}$ is the first position of the vehicle;

$\alpha_{New}$ and αref represent offsets of the transmitter clock at $t_{New}$ and $t_{ref}$ respectively;

$\epsilon_{ref}$ represents an error of the local clock when the reference measurements ($t_{ref}$) was established; and $\epsilon_{New}$ represents an error of the local clock when the reference measurement ($t_{New}$) was established.

Note that the term "vehicle" is used herein to refer to any mobile apparatus, whether manned or unmanned. The term includes ground-based, water-based, and airborne mobile apparatuses. The term encompasses vehicles that transport people, animals, and/or goods, as well as mobile robotic apparatuses, mobile surveillance devices, and mobile weaponry such as missiles and torpedoes.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
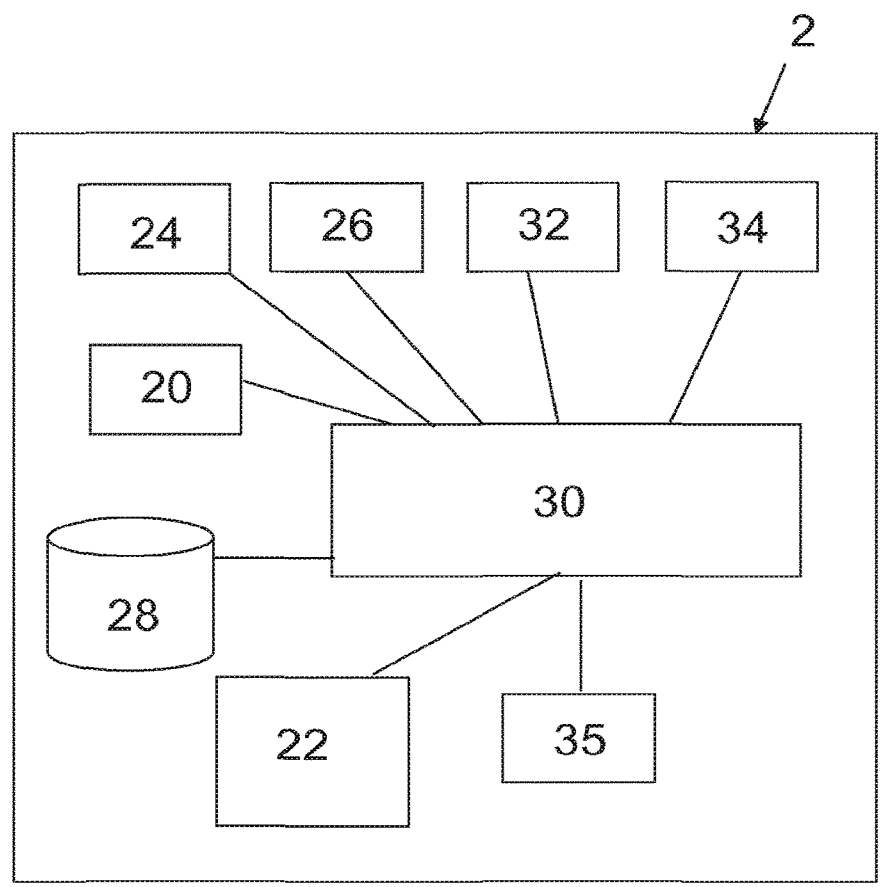
FIG. 1 shows a schematic diagram of a guidance system for an autonomous vehicle according to a first embodiment of the present invention.

Referring to FIG. 1 there is schematically shown a guidance system for an autonomous vehicle 2 according to a first embodiment of the present invention. The guidance system includes a primary positioning resource in the form of a GPS receiver 20, a terrestrial radio signal receiver 22, an Inertial Measurement Unit (IMU) 24, an interface module 26, a database 28, a general purpose processor 30, a user interface module 32, a vehicle control module 34 and a secondary processor 35 in the form of a differential positioning module dedicated to performing differential timing and distance calculations. The autonomous vehicle 2 is also equipped with a clock incorporated as part of the processor 30.

The GPS receiver 20 and terrestrial receiver 22 collect data from respective GPS and terrestrial radio signals as is known in the art, and send their data to the processor 30. The processor 30 also receives data from the IMU 24, and optionally, the interface module 26. The interface module 26 may be connected to other devices, for example receivers configured to receive radio signals other than those that can be received by the terrestrial radio signal receiver 22. In particular, the interface module 26 can allow the autonomous vehicle 2 to receive information from a reference base station 4—as is shown in FIG. 4.

Figure 4:
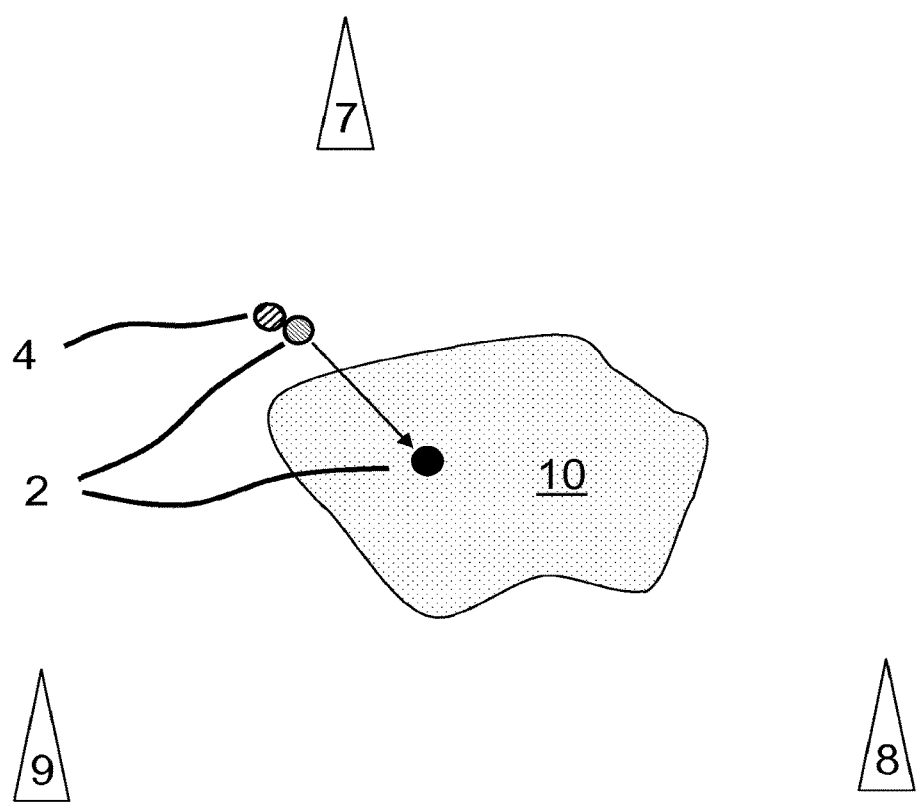
FIG. 4 is a schematic diagram showing an example of the autonomous vehicle of FIG. 1 placed within an operational environment similar to those shown in FIGS. 2 and 3, and in which there are multiple terrestrial transmitters and an actual/real reference base station.

In the embodiment of FIG. 1, the terrestrial radio signal receiver 22 is configured to receive radio signals having a frequency of between 3 MHz and 3 GHz and so is able to receive radio signals transmitted from sources of various kinds, including signals intended for navigation such as from a GSM transmitter 7, as well as signals of opportunity such as from a television UHF transmitter 8 and an FM radio station VHF transmitter 9, as shown in FIG. 4. In the embodiment of FIG. 1 the terrestrial radio signal receiver 22 is configured as a multi-channel system with approximately ten flexible channels having selectable antenna able to tune to any frequency within the above stated range and gather data over a radio signal capture window, as will be described below.

The terrestrial radio signal receiver 22 comprises one or more scanning channels per waveband that are configured to constantly sweep the band so as to pick out the set of strongest signals and determine what types of signals they are, including the modulation scheme, identification, etc., and to maintain a priority list for the flexible channels based on signal strength, bandwidth, range, fundamental accuracy, location, etc.

The processor 30 is configured to store the received data in the database 28. The processor 30 is also configured to process the data received from input modules 20, 22, 24, 26, and to store the resulting processed data in the database 28. The database 28 also stores map images, which are preloaded onto the database 28 and fetched by the processor 30 when needed.

Processed data comprises positional data obtained according to the present invention which, together with the appropriate map images, may be stored in the database 28 for future retrieval by a user as needed, and/or output by the processor to the vehicle control module 34, which can then include the position-relevant information with guidance information that is used to control movements of the autonomous vehicle 2. The user interface module 32 can also be used by a user to configure the processor 30, and to enter destination and other guidance information into the vehicle guidance module that will subsequently control movements of the autonomous vehicle 2.

The GPS receiver 20 receives GPS radio signals from a number of GPS satellites. Any radio signals that are received are fed to the processor 30 for processing and storage in the database 28. Using prior known techniques, the processor can use data from the GPS receiver 20 to determine the position of the vehicle 2, and to provide the position of the vehicle 2 to the vehicle control module 34, for use in controlling movements of the vehicle 2.

At the same time, the terrestrial radio signal receiver 22 may receive radio signals from a number of terrestrial radio signal transmitters. These radio signals are also fed to the processor 30 and/or stored in the database 28 for future retrieval.

In order to use the terrestrial radio signals for self-localization, the vehicle 2, needs to have access to information about the location of the transmitters of the terrestrial radio signals received by the terrestrial receiver 22. This information may be preloaded in the database 28, or obtained via an external source (for example, by downloading the information, or by a user inputting this information via the user interface 32 after a survey of the area containing the transmitters).

The Inertial Measurement Unit (IMU) 24 also passes IMU information to the processor relating to the speed, acceleration and orientation of the vehicle 2.

Therefore, it can be seen that the vehicle 2 receives and logs information from a number of different sources relating to its state and the state of its environment.

The state information that is received by the vehicle 2 is stored in the database 28 and processed by the processor 30 as a number of different variables. For example, there may be variables associated with:

a) the distance between the vehicle 2 and each of the terrestrial radio signal transmitters 7, 8, 9;

b) the strength of the radio signal received by the vehicle 2 from each 25 transmitter 7, 8, 9;

c) the timing offset between onboard clock of the vehicle 2 and the reference unit 4 as shown in FIG. 4;

d) the absolute position of the vehicle 2 on Earth as derived from the GPS receiver 20;

e) GPS time as derived from the GPS receiver 20; and 24;

f) speed, acceleration, orientation as derived from the inertial measurement unit as well as others, as will be apparent to a person skilled in the art.

Such input variables accessible by the vehicle 2 can be used to reinforce one another. For example, if the GPS receiver 20 provides successive updates about the position of the vehicle 2 whilst it is moving, then this can be used to determine the speed of the vehicle 2. The speed of the vehicle 2 may also be derived from the inertial measurement unit 24. As well as providing redundancy, it is possible for variables to be correlated with one another in a synergistic manner. Another example is the correlating a number of variables relating to the distance of the vehicle 2 to different geographically spaced transmitters (as shown in FIG. 4). These distance variables can thus be used synergistically to determine the position of the vehicle 2 using a trigonometric relationship. It will be understood that more complicated relationships between variables can be established and also used to minimize uncertainty about variables values.

In particular, variable values and associated variance values are stored as a state vector within the database 28. The processor 30 applies algorithms to the state vector so that variable values and variances values are modified in response to an update to linked variable values. Variables can be linked to one another algorithmically via their associations with parameters such as time, velocity and position. Thus, simply by receiving and logging additional information relating to one variable can improve the estimated values of another.

It will be understood that state information about the vehicle 2 and other entities such as transmitters can be incorporated into the state vector of the vehicle 2 to aid localization.

Furthermore, as the state vector is updated, predictions can be made about the future states using past trends. For example, if the vehicle control module 34 of the vehicle 2 is directing it to move at a constant velocity, it can be assumed that the vehicle 2 will continue to do so unless contradicting data is received. Using this method, erroneous data (from example, resulting from radio signal interference) can be discarded. The predictions can be made using a Bayesian estimator such as a Kalman filter, loaded with assumptions and/or models about the behavior of the vehicle 2 and other entities.

A specific example of an vehicle operating according to the present invention will now be given.

Figure 2:
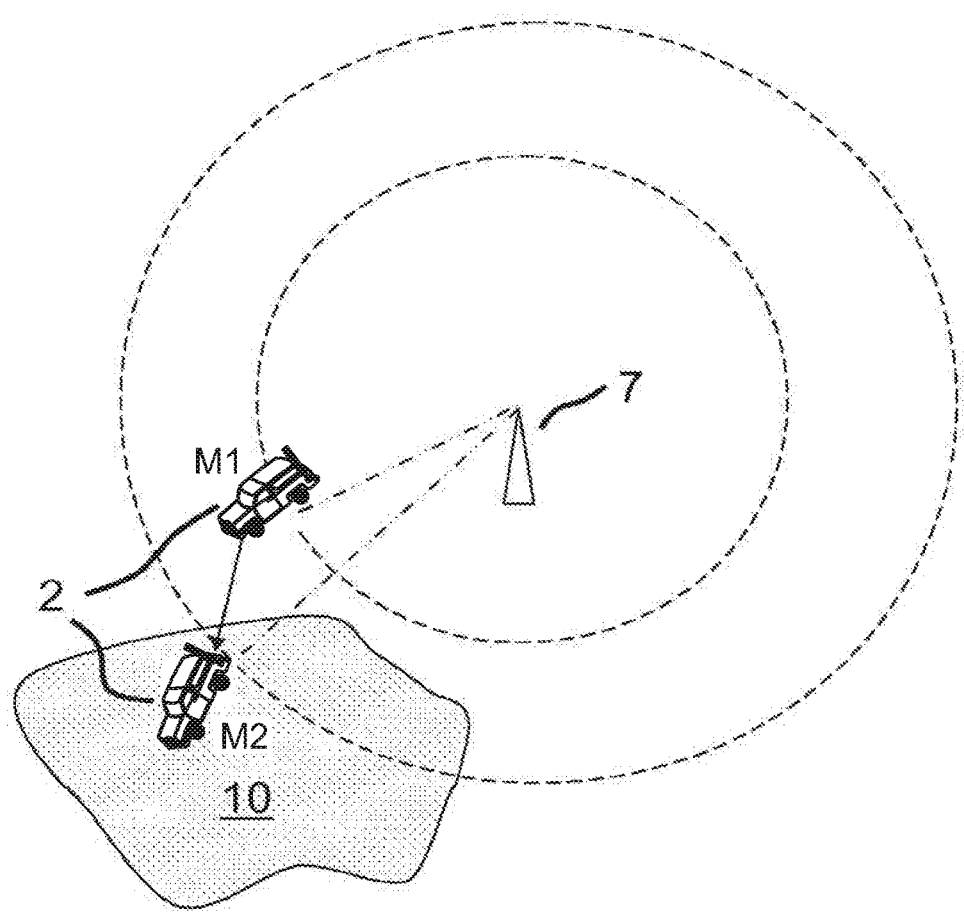
FIG. 2 is a schematic diagram showing a simplified example of the autonomous vehicle of FIG. 1 placed within an operational environment in which a virtual positioning reference is established relative to a single terrestrial transmitter prior to the autonomous vehicle entering into an area in which a primary positioning resource of the autonomous vehicle is rendered ineffective.

Referring to FIG. 2, there is shown a simplified example in which the guidance system of the vehicle 2 is configured to establish a virtual positioning reference at position M1 prior to entering a region 10 in which its primary positioning resource—in the form of the GPS receiver 20—is rendered ineffective. The vehicle 2 can then use the established virtual positioning reference to aid localization using differential radio positioning relative to the single GSM transmitter 7.

At the first position M1 of the vehicle 2, the guidance system is able to determine its position using the GPS receiver 20. Whilst at that position, the vehicle 2 also receives radio signals originating from the terrestrial GSM radio signal transmitter 7. The nature of this transmitter 7 is such that the radio signals that it transmits include repeated instances of the same code word. These are usually used by mobile telephone handsets to be able to synchronize with the GSM transmitter. However, in the present example, these code words are used by the vehicle 2 for the purpose of radio localization.

In particular, the vehicle 2 opens a radio signal capture window. In this capture window, the code words from the radio signal transmitter 7 manifest themselves as a regularly repeating series of waveforms that are substantially unique to the transmitter 7. The vehicle 2 is thus able to confidently associate those received waveforms with the GSM radio signal transmitter 7, and also determine the repeat rate of those code words.

In subsequent radio signal capture windows opened by the vehicle 2, assuming that the vehicle 2 has not moved any distance away from the GSM radio signal transmitter 7, the waveforms representing those code words will appear at predictable locations within the capture window—in other words at predictable times.

However, if the vehicle 2 has moved towards the GSM transmitter 7, the occurrence of the code words will be shifted earlier in time, and if the vehicle 2 has moved away from the GSM transmitter 7, the occurrence of the code words will be shifted later in time. The amount the code words have shifted in time corresponds to the distance traveled by the vehicle 2 relative to the GSM transmitter 7.

In any case, when the vehicle 2 is at the first position, the virtual positioning reference is established by logging in the database 28 the position as determined by the GPS receiver 20 against the time at which a first instance of a code word is received by the transmitter 7. The time at which the first instance of the code word is received by the vehicle 2 is determined by the local clock of processor 30 of the vehicle 2.

Once the virtual positioning reference is established, the vehicle 2 is then able to enter into the region 10 to position M2 in which GPS is unavailable (for example, under a dense canopy) and self-localize using the transmitter 7. The local clock of the vehicle 2 is run during movement of the vehicle 2 between the first position M1 and the second position M2. Once the vehicle 2 is at the second position M2, a second radio signal capture window is opened.

Assuming that the vehicle 2 is within range of the GSM transmitter 7, code words originating from the GSM transmitter 7 will be visible in the second opened radio signal capture window. In particular, a second instance of a code word will be present within the radio signal capture window at a given elapsed time period after receipt of the first instance of the code word. This is again measured by the clock local to the vehicle 2. The time difference between when the first instance of the code word was received and when the second instance of the code word is received relates to the time elapsed during movement of the vehicle 2 from the first position M1 to the second position M2 as well as the shift in the position of the code word as a result of the change in relative distance from the transmitter 7. The virtual positioning reference is used to determine the shift in position of the code word resulting only from the change in distance of the vehicle 2 relative to the transmitter 7.

This can be done because, as stated, the code words are repeated at a regular and therefore predictable repeat rate. Therefore the vehicle 2 can predict when a second instance of a code word would have been received by the virtual positioning reference—essentially acting as a virtual reference base station. This will be an integer multiple of the code word repeat rate added onto the time at which the first instance of the code word was received. It will be understood that the value of the integer multiplier can be determined in relation to the time elapsed since the first instance of the code word was received by the vehicle 2.

In any case, the time at which the virtual positioning reference is predicted to receive the second instance of the code word is differenced from the time when the second instance of the code word is actually received by the vehicle 2. The remaining time value is that relating to relative movement between the vehicle 2 and the transmitter 7. This is represented schematically in FIG. 2 as the difference between the radius of the smaller dashed circle (i.e. the distance of the vehicle 2 at the first position M1 away from the transmitter 7) and the radius of the larger dashed circle (i.e. the new distance of the vehicle 2 at the second position M2 away from the transmitter 7). The difference in time as a result of the change in distance of the vehicle 2 is simply factored with the known speed of the radio wave to determine the distance traveled relative to the GSM transmitter (and therefore the new distance away from the GSM transmitter 7).

The differential calculations are processed directly by the dedicated differential positioning module 35, leaving the main general purpose processor 30 free for other processing tasks. As the differential positioning module 35 is specifically set up to process these differential calculations, the overall computation and power consumption of the vehicle 2 is reduced more than if the general purpose processor 30 were to have to process these differential calculations. Thus, the presence of the differential positioning module 35 means that the positioning determination can be advantageously implemented in hardware rather than in software to be executed on the processor 30. As will be described in more detail below relation to FIG. 4, the same dedicated differential positioning module 35 can be used to perform differential calculations on data received by an actual reference base station 4 as well as a virtual positioning reference.

In the simplified 2D example shown in FIG. 2, there is only one transmitter 7 shown. However, in practice it is likely that multiple transmitters will be required to determine the exact location of the vehicle 2 through trigonometric calculations as are known in the art. However, it is not strictly necessary for there to be more than one transmitter, assuming the vehicle has access to other input variables. For example, if the guidance system of the vehicle 2 has received information from the Inertial Measurement Unit (IMU) that it has moved in a straight line at a known bearing from position M1 to M2, then in fact only a single transmitter is needed to self-localize.

Figure 3:
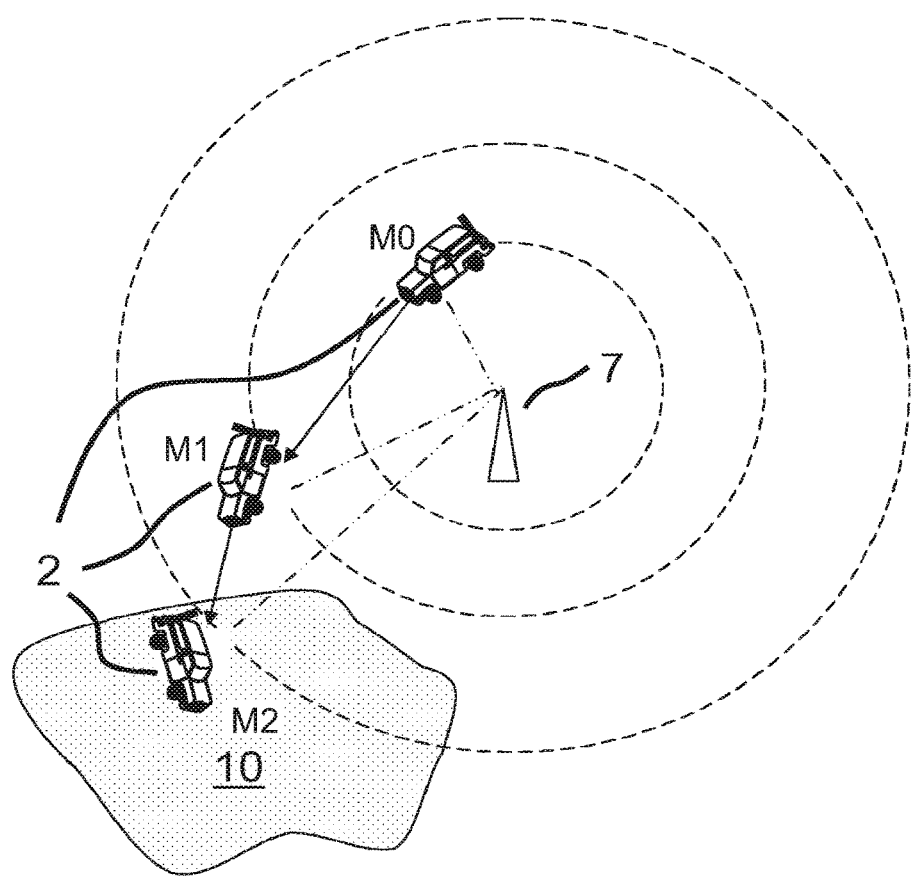
FIG. 3 is a schematic diagram showing the simplified example of FIG. 2, but where two virtual positioning references are established prior to the autonomous vehicle entering into the area in which the primary positioning resource of the autonomous vehicle is rendered ineffective.

Referring to FIG. 3, the vehicle 2 can make use of the GSM transmitter 7 to self-localize in a more robust manner than as shown in FIG. 2 by establishing additional virtual positioning references at spaced locations MO and M1. By doing so, location influenced radio signal errors such as multipath errors can be mitigated. For example, if location M1 is near a tall building, radio wave reflections from the building may affect the accurate determination of the location of the vehicle 2 (via GPS) and/or the exact time at which code words from the GSM transmitter 7 are actually received. If an additional virtual positioning reference is established at position MO, then erroneous virtual positioning reference data can be minimized. With further virtual positioning references, these errors can even be identified and eliminated.

Referring to FIG. 4, the vehicle 2 is shown in an environment in which there are multiple terrestrial radio transmitters—a GSM transmitter 7, a television UHF transmitter 8 and a FM radio station VHF transmitter 9. These transmitters are geographically spaced around a region 10 in which the vehicle 2 is unable to localize using GPS. The approximate frequency ranges of these transmitters are as follows:

| Transmitter | Approximate frequency range |
|---|---|
| GSM transmitter | 850 MHz-960 MHz and 1805 MHz-1880 MHz (UK bands) |
| TV UHF transmitter 8 | 400 MHz to 850 MHz |
| VHF transmitter 9 | 88 MHz to 108 MHz |

Thus, it can be seen that the transmitters are of different types and frequencies, and also have different code words and code word repeat rates. Thus, when establishing the virtual positioning reference in respect of each of these transmitters, the opening of a radio signal capture window will have to be for a period that guarantees the vehicle 2 to have received a code word for each transmitter. This can be done by analyzing the code word repeat rate of each of the transmitters 7, 8, 9, determining the slowest repeat rate out of the three transmitters, and then setting the period for which the radio signal capture window to be just larger than this slowest repeat period. Since opening a radio signal capture window can involve receiving, storing and processing a high level of uncompressed radio signal data, it is advantageous not to exceed this limit so as to minimize storage usage of the database 28 local to the vehicle 2.

Alternatively, given a suitably-agile radio receiver, the timings generated by the virtual reference receiver can be used to predict when each transmitter's code word is expected to arrive at the receiver, and so the receiver can be programmed to capture small amounts of data on each radio band in the required hopping sequence. This reduces the amount of superfluous data captured by using a fixed length capture window across all bands.

Also shown in FIG. 4 is an actual reference base station 4 that is intended for use in navigation. As mentioned, the same dedicated differential positioning module 35 can be used to perform differential calculations on data received by this actual reference base station 4 as well as the virtual positioning references established by the vehicle 2. In particular, instead of the vehicle 2 predicting when a code word would be received at a virtual positioning reference, the reference base station 4 instead transmits to the vehicle 2 when it actually does receive a particular instance of a code word. This can be fed through the differential positioning module 35 of the vehicle 2 in the same way as data logged at the vehicle 2 in respect of the virtual positioning reference. This relies on synchronicity between the vehicle 2 and the reference base station 4.

In summary, the method described above of establishing a virtual positioning reference takes advantage of the fact that most modern opportunistic digital signal sources (e.g. cellular, DAB, DVB, etc) use highly stable frequency/timing references. Many of such opportunistic radio signal sources often have a minimum timing stability specification that must be adhered to. As a result of this the transmitter clock offset values a remain sufficiently constant to be used for navigation over long periods of time (many hours to many days, and in some circumstances, over a week). Thus instead of calculating, storing and even sharing transmitter clock offset values a as is required by the prior art, it is only necessary to store the raw timing measurements and location of where the measurements are taken.

This more elegant method reduces the computational burden of calculating the transmitter clock offset values a. In particular, the mobile device 2 can start from a known location and log the timing signals originating from a stable, stationary terrestrial transmitter 7. The mobile navigation device can then move to a second unknown location where its primary positioning system is rendered ineffective (e.g. by electronic interference, terrain, indoor activity etc)—but it is still possible to receive the timing signals.

When the vehicle 2 moves to a new location and GPS is denied, the opportunistic reference timing measurements are updated according to the elapsed time of the local clock to provide an estimate of the opportunistic timing measure that would be measured at that given moment at the reference position if the vehicle was still there.

While the invention is described above in regard to a guidance system of an autonomous vehicle 2, it should be understood that the invention is not limited to only this application. In other embodiments, the vehicle position information obtained by the present invention is used to initiate other actions, such as presenting the position information on a display or recording the information on non-transient media for future access by a user as needed.

Note that the term "vehicle" is used herein to refer to any mobile apparatus, whether manned or unmanned. The term includes ground-based, water-based, and airborne mobile apparatuses. The term encompasses vehicles that transport people, animals, and/or goods, as well as mobile robotic apparatuses, mobile surveillance devices, and mobile weaponry such as missiles and torpedoes.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application.

This specification is not intended to be exhaustive. Although the present application is shown in a limited number of forms, the scope of the invention is not limited to just these forms, but is amenable to various changes and modifications without departing from the spirit thereof. One or ordinary skill in the art should appreciate after learning the teachings related to the claimed subject matter contained in the foregoing description that many modifications and variations are possible in light of this disclosure. Accordingly, the claimed subject matter includes any combination of the above-described elements in all possible variations thereof, unless otherwise indicated herein or otherwise clearly contradicted by context. In particular, the limitations presented in dependent claims below can be combined with their corresponding independent claims in any number and in any order without departing from the scope of this disclosure, unless the dependent claims are logically incompatible with each other.

I claim:

1. A guidance system for an autonomous vehicle configured to determine a position of the autonomous vehicle, said guidance system comprising:
   a primary positioning resource configured for determining a position of the autonomous vehicle as being at a first receiver position;
   a local clock;
   a terrestrial receiver configured to scan for signals transmitted by terrestrial transmitters of a plurality of different transmitter types, said plurality of different transmitter types including at least one type of transmitter that transmits signals of opportunity that are not intended for navigational use;
   a processor configured for distinguishing and identifying from among said signals a first signal transmitted by a first terrestrial transmitter having a known location, and for analyzing said first signal to determine a distinguishable, predictably repeated first code word and a repeat rate thereof,
   said processor being further configured for establishing a first virtual positioning reference by logging the first receiver position together with a local time measured relative to said local clock at which a first instance of the first code word is received by the autonomous vehicle;
   a differential positioning unit configured for using an output of the local clock to determine a time difference between when the first virtual positioning reference is predicted to receive a second instance of the first code word and when the autonomous vehicle actually receives the second instance of the first code word when at a second receiver position, thereby determining radio positioning information pertaining to the second receiver position of the autonomous vehicle; and
   a guidance controller configured to direct movements of the autonomous vehicle according to guidance information that includes said radio positioning information.

2. The autonomous vehicle according to claim 1, further comprising an inertial measurement unit configured to provide to the processor inertial measurement information pertaining to movement of the vehicle, said processor being further configured to determine a location of the second receiver position according to said radio positioning information and said inertial measurement information.

3. A method for obtaining radio positioning information relevant to a position of an autonomous vehicle, said method comprising:
determining the position of the autonomous vehicle as being at a first known position;
when the autonomous vehicle is at said first known position:
scanning for signals from terrestrial transmitters of a plurality of different transmitter types, said plurality of different transmitter types including at least one type of transmitter that transmits signals of opportunity that are not intended for navigational use;
distinguishing from among said signals a first signal transmitted by a first terrestrial transmitter having a known first transmitter location;
analyzing said first signal to identify a distinguishable, predictably repeated first code word and a repeat rate thereof; and
establishing a virtual positioning reference by logging the first known position together with a local time at which a first instance of the predictably repeated first code word is received by the autonomous vehicle from the first terrestrial transmitter, the local time being measured relative to a clock that is local to the autonomous vehicle;
running the local clock during movement of the autonomous vehicle from the first known position to a second position, said second position being unknown;
when the autonomous vehicle is at the second position, using the local clock to determine a first time difference between when the virtual positioning reference is predicted to receive a second instance of the first code word and when the autonomous vehicle actually receives the second instance of the first code word, and thereby determining radio positioning information relevant to the second position of the autonomous vehicle; and
controlling a movement of the autonomous vehicle according to guidance information that includes the radio positioning information.

4. The method according to claim 3, further comprising deriving the position of the autonomous vehicle at the first known position via a primary positioning resource local to the autonomous vehicle, the second position being at a position at which the primary positioning resource of the autonomous vehicle is rendered ineffective.

5. The method according to claim 3, further comprising calculating the time difference using a differential positioning module local to the autonomous vehicle.

6. The method according to claim 3, further comprising establishing a plurality of virtual positioning references at known locations that are geographically spaced apart from one another.

7. The method according to claim 3, further comprising:
identifying a distinguishable, predictably repeated second code word transmitted by a second terrestrial transmitter having a known second transmitter location that is geometrically spaced apart from the known first transmitter location, and a repeat rate thereof;
when the autonomous vehicle is at the first known position, logging a local time at which a first instance of the second code word is received by the autonomous vehicle;
when the autonomous vehicle is at the second position, using the local clock to determine a second time difference between when the virtual positioning reference is predicted to receive a second instance of the second code word and when the autonomous vehicle actually receives the second instance of the second code word; and
synergistically determining the location of the second position from the first time difference and the second time difference using a trigonometric relationship.

8. The method according to claim 7, further comprising capturing radio signal data using a radio signal capture window a length of which is limited to substantially a period of time of a most slowly repeating code word.

9. The method according to claim 3, further comprising opening a radio signal capture window at substantially the time when the virtual positioning reference is predicted to receive the second instance of the first code word for substantially a time period required to receive the second code word.

10. The method according to claim 3, further comprising estimating the second position of the autonomous vehicle by applying a Bayesian estimation filter to the radio positioning information.

11. The method according to claim 10, wherein the Bayesian estimation filter comprises a Kalman filter or a particle filter.

12. The method according to claim 10, wherein the application of a Bayesian estimation filter comprises loading the filter with at least one of:
error models associated with the first terrestrial transmitter;
error models associated with the autonomous vehicle; and
information from an inertial measurement unit about the movement of the autonomous vehicle.

13. The method of claim 3, further comprising determining a location of the second position by combining the radio positioning information with inertial measurement information obtained from an inertial measurement unit.

14. The method of claim 3, further comprising applying the equation:

$$c(t_{New}-t_{ref})=|r_{New}-b|-|r_{ref}-b|+(\alpha_{New}-\alpha_{ref})+(\epsilon_{New}-\epsilon_{ref})$$

where:
c is the known speed of the radio waves;
$t_{New}$ represents the time, measured at the autonomous vehicle using the local clock, at which the second instance of the first code word is received by the autonomous vehicle at the second position;
$t_{ref}$ represents the time, measured at the autonomous vehicle using the local clock, at which the virtual positioning reference is predicted to receive the second instance of the first code word;
$r_{New}$ is the second position of the autonomous vehicle;
b is the known first transmitter location;
$r_{ref}$ is the first position of the autonomous vehicle;
$\alpha_{New}$ and $\alpha_{ref}$ represent offsets of the transmitter clock at $t_{New}$ and $t_{ref}$ respectively;
$\epsilon_{ref}$ represents an error of the local clock when the reference measurements ($t_{ref}$) was established; and
$\epsilon_{New}$ represents an error of the local clock when the reference measurement ($t_{New}$) was established.

15. The method according of claim 14, further comprising taking a difference between a plurality of calculations of $c(t_{New}-t_{ref})$ made using the equation formulated from pairs of measurements pertaining to a plurality of different terrestrial transmitters having known locations.

16. The method of claim 14, further comprising removing local clock errors by receiving transmissions from two different terrestrial transmitters 'A' and 'B' and by applying the equation:

$$c(t^A_{new}-t^A_{ref})-c(t^B_{new}-t^B_{ref})=(|r_{new}-b^A|-|r_{ref}-b^A|+(\epsilon_{new}-\epsilon_{ref}))-(|r_{new}-b^B|-|r_{ref}-b^B|+(\epsilon_{new}-\epsilon_{ref})).$$

17. The method of claim 3, further comprising
recording the positioning information and storing the positioning information for subsequent presentation to a user.

\* \* \* \* \*